US009830113B2

(12) United States Patent
Deboard et al.

(10) Patent No.: US 9,830,113 B2
(45) Date of Patent: Nov. 28, 2017

(54) IMAGING SYSTEM CONTROLLER COORDINATION

(71) Applicant: Funai Electric Co., Ltd., Osaka (JP)

(72) Inventors: Bruce A Deboard, Georgetown, KY (US); Lucas D Barkley, Lexington, KY (US); Michael A Marra, III, Lexington, KY (US)

(73) Assignee: Funai Electric Co., Ltd, Osaka (JP)

( * ) Notice: Subject to any disclaimer, the term of this patent is extended or adjusted under 35 U.S.C. 154(b) by 0 days.

(21) Appl. No.: 15/132,387

(22) Filed: Apr. 19, 2016

(65) Prior Publication Data

US 2017/0300273 A1 Oct. 19, 2017

(51) Int. Cl.
*G06F 3/12* (2006.01)
*G06K 15/00* (2006.01)

(52) U.S. Cl.
CPC .......... *G06F 3/1206* (2013.01); *G06F 3/1279* (2013.01); *G06F 3/1294* (2013.01)

(58) Field of Classification Search
None
See application file for complete search history.

(56) References Cited

U.S. PATENT DOCUMENTS 4,196,450 A * 4/1980 Miller .................... G06K 15/00 348/552
5,140,674 A * 8/1992 Anderson ................ B41J 2/525 358/1.12
5,200,761 A * 4/1993 Kawakita ................... B41J 2/36 346/134
5,351,068 A 9/1994 Moon et al.
5,625,391 A * 4/1997 Hirabayashi ......... G06K 15/107 347/41
6,076,911 A 6/2000 Canon
7,463,372 B2 12/2008 Kunihiro
9,210,284 B2 12/2015 Yamano
2005/0083370 A1 4/2005 Ho
2005/0213134 A1 9/2005 Chikuma et al.
2007/0263252 A1 11/2007 Hara
2010/0177143 A1* 7/2010 Heimgartner .......... B41J 2/2117 347/37
2012/0050360 A1* 3/2012 Nagamura ............. B41J 2/2114 347/7
2013/0209132 A1 8/2013 Soda

* cited by examiner

*Primary Examiner* — Dov Popovici

(74) *Attorney, Agent, or Firm* — Luedeka Neely Group, P.C.; Rick Barnes

(57) ABSTRACT

A system for printing an image. A printer includes a controller for motion in an X axis, components for motion in the X axis, a print head for printing image data in a swath, and a communication module for receiving image data and communications indicating that printing the swath is authorized and that printing is completed. A substrate unit includes a controller for motion in a Y axis, components for motion in the Y axis, and a communication module for receiving image data from a source. The communication module sends at least a portion of the image data to the printer.

17 Claims, 2 Drawing Sheets

IMAGING SYSTEM CONTROLLER COORDINATION

FIELD

This invention relates to the field of printers. More particularly, this invention relates to coordinating movement between a first controller that controls movement of a print head relative to a substrate and a second controller that controls movement of the substrate relative to the print head.

INTRODUCTION

For traditional printing applications, movement of the print head relative to the printed substrate occurs in two axes, which are generally designated as X and Y. The substrate is typically an orthogonal planar medium such as a piece of paper, but need not be. The X axis can be thought of as movement from side to side across the width of the substrate, such as the movement of the print head of an ink jet printer or a thermal printer back and forth across the surface of the substrate. The print head typically makes many passes back and forth across the width of the substrate in the X axis.

For X axis motion, typically the print head moves relative to the substrate, or in other words, to an observer, the substrate stays still while the print head moves in the X axis. However, the substrate could be moved in the X axis while the print head stayed motionless in the X axis to that observer. Or, the motion in the X axis could be accomplished by a combination of moving both the substrate and the print head, as judged by an observer.

The Y axis can be thought of as movement from one end of the substrate to another along the length of the substrate, which is perpendicular to the width of an orthogonal substrate. The print head typically makes one pass along the length of the substrate in the Y axis. For Y axis motion, typically the substrate moves relative to the print head, as judged by an observer. But once again, the relative motion could be accomplished by moving the print head and holding the substrate motionless, or a combination of the two motions. All such combinations of motion in the X axis and Y axis are contemplated herein when referring to motion.

Prior art imagers typically have a single print head that prints onto a single substrate, and a single processor controls both the print head motion and the substrate motion. However, this is a very limited implementation.

What is needed, therefore, is a system that reduces issues such as those described above, at least in part.

SUMMARY

The above and other needs are met by an imaging system for printing an image on a substrate. A printer includes an X axis motion controller for controlling motion of the printer in an X axis along a width of the substrate, X axis motion components for implementing motion of the printer in the X axis under the control of the X axis motion controller, and a print head for printing image data in a swath along the width of the substrate when printing is authorized. The printer also includes a communication module for receiving the image data, receiving communications indicating that printing of the swath is authorized, and sending communications indicating that printing of the swath is completed. A substrate unit includes a Y axis motion controller for controlling motion of the substrate in a Y axis along a length of the substrate, Y axis motion components for implementing motion of the substrate in the Y axis under the control of the Y axis motion controller, and a communication module for receiving image data from an image data source. The communication module also sends at least a portion of the image data to the printer, sends communications to the printer indicating that printing of the swath is authorized, and receives communications from the printer indicating that printing of the swath is completed.

In various embodiments according to this aspect of the invention, there is just one substrate unit and a plurality of printers. In some embodiments, each occurrence of motion in the Y axis is accomplished only in a predetermined distance. In some embodiments, motion in the Y axis is accomplished in a selectable distance based at least in part upon input received by the substrate unit from the printer. In some embodiments, the communication module for the printer issues only one signal, which indicates to the substrate unit that movement of the substrate in the Y axis is permissible, and the communication module for the substrate unit issues only one signal, which indicates to the printer that movement of the print head in the X axis is permissible. In some embodiments, the communication modules for the printer and the substrate unit communicate one with another using the universal serial bus protocol. In some embodiments, motion in the Y axis is accomplished by the substrate unit by causing the entire printer to move relative to the substrate.

According to a further aspect of the invention there is described a printer for printing an image on a substrate. An X axis motion controller controls motion of the printer in an X axis along a width of the substrate. X axis motion components implement motion of the printer in the X axis under the control of the X axis motion controller. A print head prints image data in a swath along the width of the substrate when printing is authorized. A communication module receives the image data, and communications indicating that printing of the swath is authorized. The communication module also sends communications indicating that printing of the swath is completed. Authorization and all motion of the substrate in a Y axis along a length of the substrate is performed by a substrate unit that is not a part of the printer.

According to another aspect of the invention there is described a substrate unit for moving a substrate that is being printed. A Y axis motion controller controls motion of the substrate in a Y axis along a length of the substrate. Y axis motion components implement motion of the substrate in the Y axis under the control of the Y axis motion controller. A communication module receives image data from an image data source, and sends at least a portion of the image data to a printer. The communication module also sends communications to the printer indicating that printing of a swath is authorized, and receives communications from the printer indicating that printing of the swath is completed. The substrate unit does not directly control any movement of the substrate in the X axis across a width of the substrate.

According to yet another aspect of the invention there is described a method for printing an image on a substrate. A printer receives image data, receives communications indicating that printing is authorized, controls motion of the printer in an X axis along a width of the substrate, prints image data in a swath along the width of the substrate when printing is authorized, and sends communications indicating that printing of the swath is completed. A substrate unit receives image data from an image data source, sends at least a portion of the image data to the printer, sends communications to the printer indicating that printing of the swath is authorized, receives communications from the printer indicating that printing of the swath is completed, and controls motion of the substrate in a Y axis along a length of the substrate.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

In prior art printers, control of relative motion in the X axis and control of relative motion in the Y axis are integrated together into one controller. According to various embodiments of the present invention, the X axis control and the Y axis control are split out into separate and independent controllers, which coordinate their movements as described herein.

Figure 1:
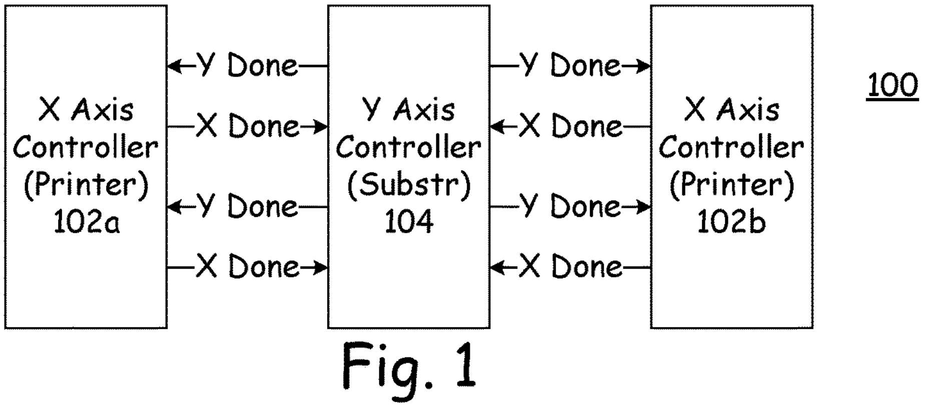
FIG. 1 depicts a simplified embodiment of the communication between two printers (X axis controllers) and a substrate unit (Y axis controller) according to an embodiment of the invention.

With reference now to FIG. 1, there is depicted a simplified functional block diagram of an imaging system 100 according to an embodiment of the present invention. This embodiment depicts two printers 102*a* and 102*b* associated and in communication with a single substrate unit 104. However, this is only for simplicity in creating and describing the drawings. In other embodiments there may be many more printers 102 associated and in communication with the substrate unit 104, all of which printers 102 are printing on the same substrate, the movement of which substrate is under the control of the substrate unit 104.

In this manner, the printers 102 can be thought of as expandable resources to the substrate unit 104, and either a greater number or a lesser number of printers 102 can be added to the imaging system 100 at different times and for different imaging jobs, as desired or available. The imaging system 100 receives image data, such as from a computer over a network interface. Depending upon the print job to be performed, either one, several, or all of the printers 102 will receive image data to be printed onto a common substrate.

As depicted, each of the printers 102 is informed by the substrate unit 104 when movement in the Y axis is completed, and the printers 102 can print some or all of their image data. When a given printer 102*a* or 102*b* has completed its movement in the X axis, such as by actually printing a swath of image data, it then signals back to the substrate unit 104 that it has completed its motion. The printer 102 then waits until the substrate unit 104 completes the next movement of the substrate and sends a signal to the printer 102 of such, at which time the printer 102 prints a new portion of image data. This process repeats for all of the printers 102, either synchronously or asynchronously, until the image has been rendered on the substrate by the imaging system 100.

Figure 4:
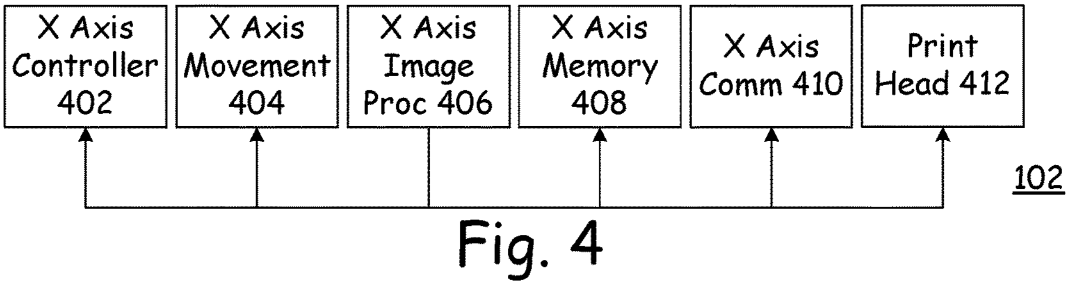
FIG. 4 depicts a functional block diagram of a printer according to an embodiment of the invention.

In some embodiments as depicted in FIG. 4, the print head 412 itself, X axis controller 402, and components 404 for motion of the print head 412 in the X axis (such as motors, belts, steppers, rails, etc.) are referred to as the printer 102. In some embodiments the printer 102 also includes an image processor 406 that cuts the image data into bands or swaths that are printed in one or more pass across the substrate in the X axis while the substrate is held in the same position. In some embodiments that function is performed by the same controller 402 that controls X axis motion.

Some embodiments also include a memory 408 to hold image data, such as until it is used to print onto the substrate. In some embodiments the memory 408 holds the entire image, even though the given printer 102*a* or 102*b* will only process and print a portion of the image. In other embodiments the given printer 102*a* or 102*b* only receives that portion of the image data that it will print onto the substrate. In some embodiments each of the printers 102 receives all of the image data that it will receive for a given job at the beginning of the print job. In other embodiments a printer 102 only receives that image data that it is to print in a given pass or iteration of the printer 102.

Some embodiments of the printer 102 include a communication module 410, such as for communicating with the substrate unit 104, as depicted in FIG. 1, and receiving image data. In some embodiments the communication module 410 of a given printer 102*a* can communicate directly or indirectly with one or all of the other printers 102*b*.

Figure 5:
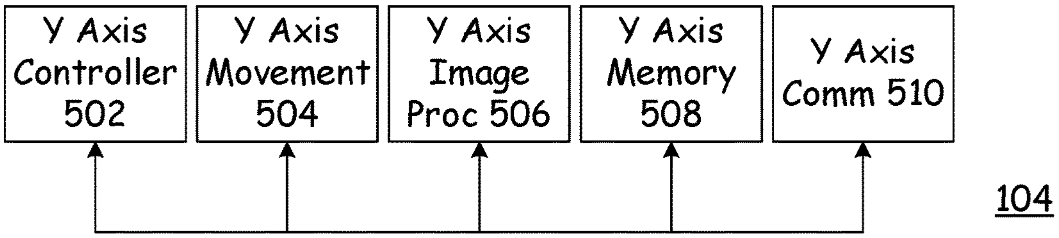
FIG. 5 depicts a functional block diagram of a substrate unit according to an embodiment of the invention.

In some embodiments the architecture of the substrate unit 104 is as depicted in FIG. 5, and is a separate and distinct piece of equipment from the printers 102. As depicted in FIG. 5, the substrate unit 104 includes the Y axis controller 502, which is the only element of the system 100 that moves the substrate. The substrate unit 104 in some embodiments also includes components for the physical motion of the substrate in the Y axis, such as motors, belts, gears, bars, rails, tracks, platens, and other motion inducing elements.

In some embodiments the substrate unit 104 includes an image processor 506. In these embodiments, the substrate unit 104 functions as a master controller for the imaging system 100, by receiving the image data from the job source, as introduced above, storing it in a memory 508, dividing the job up amongst the printers 102 that have been attached to, associated with, and in communication with the substrate unit 104, and then sending that image data out to the printers 102 through the communication module 510.

In those embodiments where the substrate unit 104 functions as a master controller, the substrate unit 104 can communicated the image data to the printers 102 in a variety of different ways. For example, in one embodiment all of the image data is sent to every one of the printers 102, but then specific instructions as to what portion of the image data a given printer 102 is to print is sent to the given printer 102, either at the start of the job or as the job progresses. Alternately, only that portion of the image data that is to be printed by a given printer 102 is sent to that given printer 102, either all at the start of the job or in portions as need when the printer 102 is about to print a given portion of the image data.

In some embodiments, printing the swaths under the control of the printers 102 is held until the substrate unit 104 has moved the substrate into the correct position. In this manner, differing and multiple printers 102 can be paired with differing substrate units 104, and the resultant imaging systems 100 as described herein provide for proper communication between the one or more printer 102 and the substrate unit 104.

In some embodiments there is defined a set of signals that are shared between the one or more printer 102 and the substrate unit 104. These signals allow for efficient transfer of motion control responsibility between the X axis controller 402 and the Y axis controller 502. This allows many different types of printers 102 to be easily paired with many different types of substrate units 104.

In addition, the system 100 described herein allows for embodiments where multiple printers 102 operate independently of one another at the same time within a single integrated imaging system 100. In some embodiments each of these printers 102 coordinates separately with the substrate unit 104, which makes relative Y axis motion decisions in regard to the substrate based at least in part upon the input that it receives from all of the printers 102 incorporated into the overall imaging system 100.

GPIO Communication Embodiment

Figure 2:
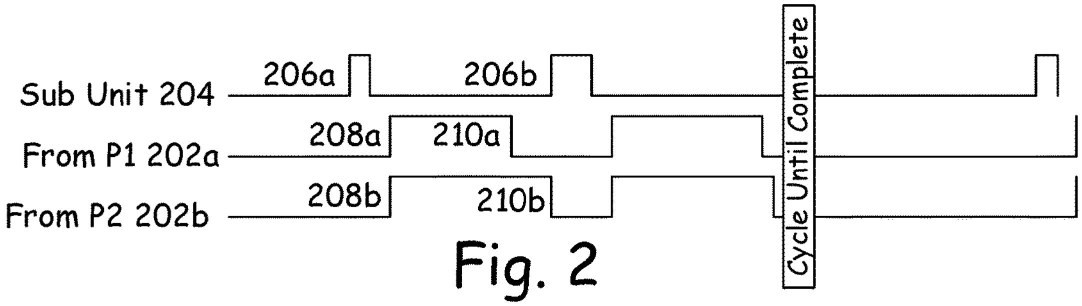
FIG. 2 depicts a timing diagram of the communication between two printers and a substrate unit according to an embodiment of the invention.

In this embodiment, as depicted in FIG. 2, only two signals are defined, which results in a very simple and efficient communication between the printers 102 and the substrate unit 104. These signals are described below.

PRINT_WAIT 204: The substrate unit 104 sets this signal 204 high at events 206, indicating that the printers 102 need to wait and not print. During the high state of signal 204, the substrate unit 104 can move the substrate without disrupting the operation of the printers 102. Once this signal 204 is low, the printers 102 are free to print at least one swath before checking the state of signal 204 again.

SCANNING 202: Once PRINT_WAIT 204 is set low, a printer 102 (either P1 or P2 as labeled in FIG. 2) sets this signal 202 high to indicate that it is printing a swath. The substrate unit 104 will not move the substrate until this signal 202 goes back to low under the control of the printer 102 that issues the signal 202.

So, in reference to FIG. 2, the substrate unit 104 sets signal 204 high at event 206*a*, indicating to the printers 102 that they should not print, because the substrate unit 104 is moving the substrate, or otherwise does not authorize a print procedure from one or more of the printers 102. When it is okay for printing to occur, such as after the substrate has been moved and is once again settled in a desired location, then the substrate unit 104 sets the signal 204 to go low once again.

At that point where the signal 204 is once again low, the printers 102 (P1 or P2 as indicated in FIG. 2) set their associated scan lines 202 high, such as at events 208, which indicates to the substrate unit 104 that printing or some other operation is occurring and that the substrate should not be moved. At some point when the printers 102 have completed their print swath, for example, they set their respective scanning lines 202 low, such as at events 210. Once the substrate unit 104 detects that the scan lines 202 are low, it understands that it can then initiate another movement of the substrate, and sets the print wait line 204 high, such as at event 206*b*, so that the printers 102 do not try to print while the substrate is being moved. This process of setting the signal lines 202 and 204 high and low to signal between the substrate unit 104 and the printers 102 continues until the print job is complete.

USB Communication Embodiment

Figure 3:
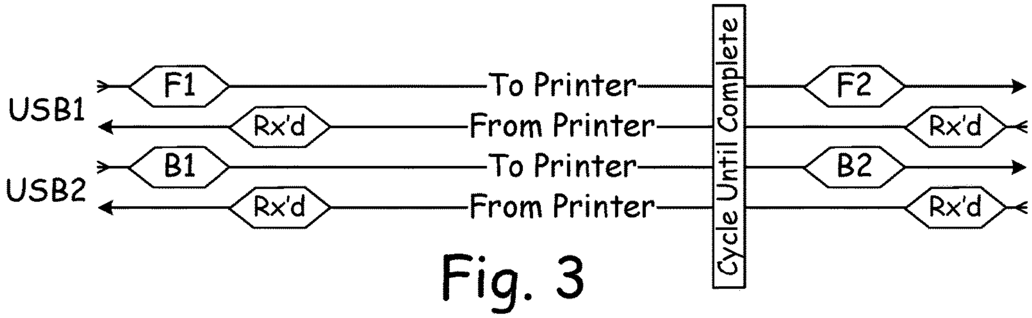
FIG. 3 depicts USB communication between a two printers and a substrate unit according to an embodiment of the invention.

The universal serial bus (USB) embodiments as generally depicted in FIG. 3 provide more flexibility in the amount of Y axis movement, and thereby increase the number of supported print modes. In these embodiments the printers 102 and the substrate unit 104 communicate using bidirectional USB commands. The printer 102*a* or 102*b* accepts a command F1 or B1, respectively, from the substrate unit 104 that allows the given printer 102 to print one swath (for example), and after that swath is finished, the printer 102 returns a command Rx'd that indicates to the substrate unit 104 (1) that the printer 102 has completed the desired swath(s), and (2) the Y axis movement that the printer 102 desires the substrate unit 104 to perform. The substrate unit 104 then moves the substrate (or the entire printer 102 itself relative to the substrate) so as to be ready for the next swath. The communication between the print heads 102 and the substrate unit 104 continues in this fashion (F2 B2, F3 B3, etc.) until the imaging job is complete.

In various embodiments, the synchronization between the printers 102 and the substrate unit 104 may include a pre-defined distance for the Y axis motion, or the distance of the Y axis motion may be communicated from the printers 102 to the substrate unit 104. In the case of a pre-defined distance, a set of pre-defined modes can be provided, where different modes are associated with different pre-defined distances, and from which the desired mode is selected. Alternately, each printer 102 can communicate to the substrate unit 104 the desired amount of Y axis motion.

In some embodiments where multiple printers 102 are communicating with a single substrate unit 104, each printer 102 communicates a desired move distance to the substrate unit 104, and the Y axis controller 502 of the substrate unit 104 determines the actual Y axis move amount, which is then communicated back to the printers 102, each of which, for example, adjusts its print swath width accordingly.

In various embodiments the substrate is a piece of paper or other planar surface. In some embodiments the substrate is a three dimensionally-surfaced object. In some embodiments different printers 102 with different capabilities for printing on different substrate topologies and different substrate materials are used to print on different portions of a complex substrate, as needed. In some embodiments, movement of the substrate in the Y axis constitutes rotating the substrate, such as might be accomplished with a cylindrical substrate.

In some embodiments one or more printers 102 print on one side of the substrate, while one or more printers 102 print on the other side of the substrate. In some embodiments different printers 102 print on different portions of the same side of the substrate.

In some embodiments the printers 102 are associated with the substrate unit 104 by attaching a dedicated umbilical between each printer 102 and the substrate unit 104, where the umbilical provides all of the power and communication required by the printer 102.

In some embodiments the substrate is too large to move, and so the substrate unit 104 causes the entirety of a given printer 102 to move in the Y axis, and then the print head 412 of the printer 102 is moved in the X axis under the control of the X axis controller 402.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An imaging system for printing an image on a substrate, the imaging system comprising:

a plurality of printers, each printer comprising, a separate and independent X axis motion controller for controlling motion of the printer in an X axis along a width of the substrate, X axis motion components for implementing motion of the printer in the X axis under the control of the X axis motion controller, a print head for printing image data in a swath along the width of the substrate and a communication module for, receiving the image data, receiving communications indicating that printing of the swath is authorized, and sending communications indicating that printing of the swath is completed, and only one substrate unit comprising, a separate and independent Y axis motion controller for controlling motion of the substrate in a Y axis along a length of the substrate, Y axis motion components for implementing motion of the substrate in the Y axis under the control of the Y axis motion controller, a communication module for receiving image data from an image data source, and sending at least a portion of the image data to each of the plurality of printers, sending communications to each of the plurality of printers indicating that printing of the swath is authorized, and receiving communications from each of the plurality of printers indicating that printing of the swath is completed, wherein the only one substrate unit moves the substrate beneath the plurality of printers.

2. The imaging system of claim 1, wherein each occurrence of motion in the Y axis is accomplished only in a predetermined distance.

3. The imaging system of claim 1, wherein motion in the Y axis is accomplished in a selectable distance based at least in part upon input received by the substrate unit from the printer.

4. The imaging system of claim 1, wherein the communication module for the printer issues only one signal, which indicates to the substrate unit that movement of the substrate in the Y axis is permissible, and the communication module for the substrate unit issues only one signal, which indicates to the printer that movement of the print head in the X axis is permissible.

5. The imaging system of claim 1, wherein motion in the Y axis is accomplished by the substrate unit by causing the printer to move relative to the substrate.

6. A plurality of printers for printing an image on a substrate, each of the plurality of printers comprising, an X axis motion controller for controlling motion of the printer in an X axis along a width of the substrate, and having no control of motion of either the substrate or the printer in a Y axis along a length of the substrate, X axis motion components for implementing motion of the printer in the X axis under the control of the X axis motion controller, a print head for printing image data in a swath along the width of the substrate, and a communication module for, receiving the image data, receiving communications indicating that printing of the swath is authorized, and sending communications indicating that printing of the swath is completed, where authorization and all motion of the substrate in the Y axis along the length of the substrate is performed by a commonly-shared substrate unit that is not a part of any one of the plurality of printers, wherein the commonly-shared substrate unit moves the substrate beneath the plurality of printers.

7. The plurality of printers of claim 6, wherein each occurrence of motion in the Y axis is accomplished only in a predetermined distance.

8. The plurality of printers of claim 6, wherein motion in the Y axis is accomplished in a selectable distance based at least in part upon input received by the substrate unit from the printer.

9. The plurality of printers of claim 6, wherein the communication module for the printer issues only one signal, which indicates to the substrate unit that movement of the substrate in the Y axis is permissible, and the communication module for the printer receives only one signal from the substrate unit, which indicates to the printer that movement of the print head in the X axis is permissible.

10. The plurality of printers of claim 6, wherein the communication module for the printer uses universal serial bus protocol.

11. The plurality of printers of claim 6, wherein motion in the Y axis is accomplished by the substrate unit by causing the printer to move relative to the substrate.

12. A substrate unit for moving a substrate that is being printed, the substrate unit comprising, a Y axis motion controller for controlling motion of the substrate in a Y axis along a length of the substrate, and having no control of motion of either the substrate or a plurality of connected printers in an X axis along a width of the substrate, Y axis motion components for implementing motion of the substrate in the Y axis under the control of the Y axis motion controller, a communication module for receiving image data from an image data source, and sending at least a portion of the image data to the plurality of connected printers, sending communications to the plurality of connected printers indicating that printing of a swath is authorized, and receiving communications from the plurality of connected printers indicating that printing of the swath is completed, where the substrate unit does not directly control any movement of the substrate in the X axis across the width of the substrate, wherein only one substrate unit moves the substrate beneath the plurality of connected printers.

13. The substrate unit of claim 12, wherein each occurrence of motion in the Y axis is accomplished only in a predetermined distance.

14. The substrate unit of claim 12, wherein motion in the Y axis is accomplished in a selectable distance base at least in part upon input received by the substrate unit from the plurality of connected printers.

15. The substrate unit of claim 12, wherein each of the plurality of connected printers issues only one signal to the substrate unit, which indicates to the substrate unit that movement of the substrate in the Y axis is permissible, and the substrate unit issues only one signal to the plurality of connected printers, which indicates to the plurality of connected printers that printing of the swath in the X axis is permissible.

16. The substrate unit of claim 12, wherein communication between the plurality of connected printers and the substrate unit is accomplished using universal serial bus protocol.

17. The substrate unit of claim 12, wherein motion in the Y axis is accomplished by the substrate unit by causing the plurality of connected printers to move relative to the substrate.

* * * * *